United States Patent
Kou et al.

(10) Patent No.: US 11,958,718 B2
(45) Date of Patent: Apr. 16, 2024

(54) MULTI-CHANNEL IMPACT-RESISTANT INTELLIGENT-CONSTANT-DECELERATION HYDRAULIC BRAKING SYSTEM

(71) Applicants: TAIYUAN UNIVERSITY OF TECHNOLOGY, Shanxi (CN); Guiyang Plateau Mining Machinery Company Limited, Guizhou Province (CN)

(72) Inventors: Ziming Kou, Shanxi (CN); Zhensheng Wang, Shanxi (CN); Juan Wu, Shanxi (CN); Deling Xie, Shanxi (CN); Yandong Wang, Shanxi (CN); Waiwen Zhang, Shanxi (CN); Linan Zhang, Shanxi (CN)

(73) Assignees: TAIYUAN UNIVERSITY OF TECHNOLOGY, Shanxi (CN); Guiyang Plateau Mining Machinery Company Limited, Guizhou (CN)

( * ) Notice: Subject to any disclaimer, the term of this patent is extended or adjusted under 35 U.S.C. 154(b) by 1053 days.

(21) Appl. No.: 16/835,244

(22) Filed: Mar. 30, 2020

(65) Prior Publication Data
US 2021/0061613 A1   Mar. 4, 2021

(30) Foreign Application Priority Data

Aug. 30, 2019   (CN) .......................... 201910816114.6

(51) Int. Cl.
*B66B 1/32*   (2006.01)
*B66B 1/36*   (2006.01)
(Continued)

(52) U.S. Cl.
CPC .................. *B66B 1/32* (2013.01); *B66B 1/36* (2013.01); *B66B 3/002* (2013.01); *B66B 5/0025* (2013.01);
(Continued)

(58) Field of Classification Search
CPC ........... B66B 1/32; B66B 1/36; B66B 5/0031; B66B 5/0025; B66B 5/02; B66B 3/002;
(Continued)

(56) References Cited

U.S. PATENT DOCUMENTS 5,941,608 A * 8/1999 Campau .................. B60T 13/16
303/84.2
2017/0327097 A1* 11/2017 Saito ...................... B60T 13/686
(Continued)

*Primary Examiner* — Vishal R Sahni
(74) *Attorney, Agent, or Firm* — JCIP GLOBAL INC.

(57) ABSTRACT

The present invention discloses a multi-channel impact-resistant intelligent-constant-deceleration hydraulic braking system, and relates to the field of safety braking control for mine hoist systems. A technical point of the braking system is that the braking system includes a braking circuit formed by a constant-deceleration hydraulic system, a constant-deceleration electrical closed-loop control system, and a detection and feedback apparatus. The constant-deceleration hydraulic system is provided with N+1 independent complete oil return channels, where N is a positive integer greater than or equal to 3. The oil return channels are disposed in parallel to form parallel independent braking circuits, that is, are "multi-channel" and do not have a "common output point". The oil return channel includes a backup oil source, an electro-hydraulic signal conversion and amplification component, an operating mode switching apparatus, and an execution component that are sequentially connected. The oil return channels include one backup channel and N working channels. Functions such as constant-deceleration braking, impact and vibration limiting, rope slip prevention, derailing prevention, and overwinding prevention can be safely and reliably achieved when a mine hoist system normally stops, performs operation braking or performs safety braking, thereby greatly reducing an accident rate.

9 Claims, 2 Drawing Sheets

(51) Int. Cl.
*B66B 3/00* (2006.01)
*B66B 5/00* (2006.01)
*B66B 5/02* (2006.01)
*B66B 19/00* (2006.01)
*B66B 19/06* (2006.01)
*B66D 5/28* (2006.01)
*B66D 5/26* (2006.01)
*F16D 121/02* (2012.01)

(52) U.S. Cl.
CPC .............. *B66B 5/0031* (2013.01); *B66B 5/02* (2013.01); *B66B 19/00* (2013.01); *B66B 19/06* (2013.01); *B66B 5/28* (2013.01); *B66D 5/26* (2013.01); *B66D 2700/035* (2013.01); *F16D 2121/02* (2013.01)

(58) Field of Classification Search
CPC ....... B66B 19/00; B66B 19/06; B60T 17/221; B60T 2270/402; B60T 2270/403; B60T 2270/414
See application file for complete search history.

(56) References Cited

U.S. PATENT DOCUMENTS

2018/0290636 A1* 10/2018 Watanabe ................. B60T 8/17
2019/0184958 A1*  6/2019 Watanabe ............. B60T 13/686
2019/0210581 A1*  7/2019 Saito .................... B60T 13/686

* cited by examiner

MULTI-CHANNEL IMPACT-RESISTANT INTELLIGENT-CONSTANT-DECELERATION HYDRAULIC BRAKING SYSTEM

CROSS-REFERENCE TO RELATED APPLICATION

This application claims the priority benefit of China application serial no. 201910816114.6, filed on Aug. 30, 2019. The entirety of the above-mentioned patent application is hereby incorporated by reference herein and made a part of this specification.

BACKGROUND

Technical Field

The present invention relates to the field of safety braking control for mine hoist systems, and more specifically, to a multi-channel impact-resistant intelligent-constant-deceleration hydraulic braking system.

Description of Related Art

Mine hoists are vital equipment in underground mining and bear important tasks of transporting minerals, equipment, materials, and people up and down mine shafts. The performance of mine hoists is crucial for the safe production in mines. Malfunctioning braking in operation can lead to catastrophic consequences. Therefore, the braking performance and reliability of a braking system are essential for the safe production of a mine hoist system. An electro-hydraulic braking system is a critical part that determines the safety braking performance of a hoist. Safety braking is a braking action to make an abrupt stop to avoid an accident during the operation of a hoist or a hoist winch. A safety braking process is mainly completed by the electro-hydraulic braking system.

At present, constant-torque two-stage braking is a common safety braking manner used in hoist systems from home and abroad. In this manner, the deceleration is often excessively large during emergency braking. For a multi-rope hoist, excessively large deceleration causes a steel rope to slip and exceed an anti-slip limit. For a single-rope hoist, a rope is more prone to breakage to jeopardize the safety of equipment and people. A constant-deceleration safety braking control manner is currently the most advanced safety braking manner for a mine hoist system. However, a single circuit is used in common constant-value closed-loop constant-deceleration safety braking apparatuses at present. That is, a closed-loop control system formed by a single braking apparatus, an electro-hydraulic control apparatus, and a detection and feedback apparatus implements a constant-value closed-loop braking control function of the hoist system during safety braking.

For example, in the Chinese Invention Patent "Constant-deceleration Safety Braking Redundancy Hydraulic Station and Control Method Thereof" disclosed in the prior art, three forms are used to implement safety braking: constant-deceleration braking implemented by a proportional directional valve, constant-deceleration braking implemented by a proportional overflow valve, and constant-torque two-stage braking implemented by an overflow valve. Although a redundancy design with a plurality of channels is used to implement safety braking, each channel depends on the simultaneous action of a plurality of electromagnetic reversing valves to implement safety braking, and the need for all the electromagnetic reversing valves means reduced reliability. In addition, in the third form of constant-torque two-stage braking implemented by an overflow valve, deceleration is often excessively large during emergency braking. For a multi-rope hoist, excessively large deceleration causes a steel rope to slip and exceed an anti-slip limit. For a single-rope hoist, a rope is more prone to breakage to jeopardize the safety of equipment and people.

In the Chinese Invention Patent "Synchronous Common-point Multi-channel Constant-deceleration Safety Braking System and Method for Mine Hoist" in the prior art, a backup circuit and a working circuit are connected in parallel (that is, a common output point) and work at the same time (synchronously), and each separate braking circuit implements constant-deceleration braking according to the control of a same constant-deceleration given-value instruction signal and a same speed feedback signal, thereby greatly improving the reliability of a braking system. However, a dual closed-loop control strategy, that is, a "pressure-speed" dual closed-loop control manner, is used in the constant-deceleration braking system in the invention. In this manner, a speed loop and a pressure loop coexist, and a pressure control loop is the basis for a speed closed loop. The pressure loop in dual closed-loop control is used to keep an oil pressure value output by a hydraulic braking system constant. However, even if the interference of other factors is not considered, the constant oil pressure value output by the hydraulic braking system is still far from adequate to ensure that the hoist has constant deceleration. For constant-torque two-stage safety braking, even if braking torque is constant, the deceleration of the hoist still fluctuates widely. Therefore, to implement constant-deceleration braking, oil pressure output by the hydraulic braking system should be constantly changing. It can be learned that the pressure loop in the "pressure-speed" dual closed-loop control manner cannot be used to adequately ensure the effect of constant-deceleration braking. In addition, one more closed loop in a closed-loop control system clearly leads to a more complex and less reliable system. In another aspect, the backup circuit and the working circuit are connected in parallel (that is, the common output point) in the invention. The entire hydraulic braking system fails when a fault occurs at the common output point, and eventually the braking of the mine hoist fails, causing an accident.

Based on the problems in the prior art and the market demands, there is an urgent need for a new solution that can greatly prevent a mine hoist system from accidents such as impacted vibration, overwinding, rope loosening, derailing, and slipping caused by a hydraulic braking system.

SUMMARY

In view of the deficiencies in the prior art, the objective of the present invention is to provide a multi-channel impact-resistant intelligent-constant-deceleration hydraulic braking system, so that functions such as constant-deceleration braking, impact and vibration limiting, rope slip prevention, derailing prevention, and overwinding prevention are safely and reliably achieved when a mine hoist system normally stops, performs operation braking or performs safety braking, thereby greatly reducing an accident rate.

To achieve the foregoing technical objective, the present invention provides the following technical solution: A multi-channel impact-resistant intelligent-constant-deceleration hydraulic braking system includes a braking circuit formed by a constant-deceleration hydraulic system, a constant-deceleration electrical closed-loop control system, and a detection and feedback apparatus, where the constant-deceleration hydraulic system is provided with N+1 independent complete oil return channels, where N is a positive integer greater than or equal to 3, the oil return channels are disposed in parallel to form parallel independent braking circuits, that is, are "multi-channel" and do not have a "common output point", and the oil return channel includes a backup oil source, an electro-hydraulic signal conversion and amplification component, an operating mode switching apparatus, and an execution component that are sequentially connected;

the oil return channels include one backup channel and N working channels;

the backup oil source is configured to supply hydraulic oil to the constant-deceleration hydraulic system in a case such as safety braking and a power outage;

the electro-hydraulic signal conversion and amplification component is configured to output hydraulic oil with accordingly changing flow rates and directions in response to an input continuously-changing electrical signal instruction;

the constant-deceleration electrical closed-loop control system is configured to: receive a speed feedback signal, compare the speed feedback signal with a built-in set speed signal, and send a control instruction to the electro-hydraulic signal conversion and amplification component according to a comparison result to form a closed-loop speed control circuit via the execution component; and the detection and feedback apparatus is configured to: collect a speed feedback signal of a winding drum of a hoist, and feed back the speed feedback signal to a constant-deceleration electrical closed-loop control system of each oil return channel.

By means of the technical solution, a solution with a single station, dual pumps, a plurality of working channels, and one backup oil return channel is adopted. To ensure an adequate safety factor, at least three or more independent working oil return channels should be disposed and connected in parallel to form a control system, and one backup oil return channel is disposed.

A plurality of independent working oil return channels are all in a working state, and one backup oil return channel is in an off state. If one of the hydraulic oil return channels is congested, 75% (in the case of four working channels) or 67% (in the case of three working channels) of the braking force still remains, unlike that in other hydraulic braking systems, three or more times of braking torque is generated to cause accidents such as severe braking impact, slipping or rope loosening, and rope breakage in the hoist system that is operating at a high speed.

The independent working oil return channels can separately complete a constant-deceleration braking process of the control system, and can control a braking process of the execution component together under the control of an instruction signal of a same constant-deceleration set value and a speed feedback signal detected by a same speed sensor. When one of the independent working oil return channels encounters a fault of no output, the oil return channel is in an off state, the hydraulic braking system rapidly switches to the backup oil return channel, and four independent oil return channels still can normally complete a constant-deceleration safety braking process. When two of the independent working oil return channels encounter a fault of no output, the hydraulic braking system rapidly switches to the backup oil return channel, and three independent oil return channels still can normally complete a constant-deceleration safety braking process. When one of the independent working oil return channels encounters a fault of complete oil leakage and is in an on state, the hydraulic braking system rapidly switches to the backup oil return channel. By means of a compensation effect of an effective output of the backup oil return channel, the entire control system still can normally complete a constant-deceleration safety braking process.

Preferably, the electro-hydraulic signal conversion and amplification component is disposed as an electro-hydraulic proportional directional valve, and the electro-hydraulic proportional directional valve changes a moving direction of a valve core according to the sign of an input electrical signal, and proportionally controls an opening degree of the valve core according to the magnitude of the input electrical signal.

By means of the foregoing technical solution, the electro-hydraulic proportional directional valve can change the moving direction of the valve core according to the sign of the input electrical signal to change a flowing direction of hydraulic oil, thereby producing the effect of a reversing valve; and can proportionally control the opening degree of the valve core according to the magnitude of the input electrical signal to achieve the objective of controlling a flow rate of hydraulic oil, thereby producing the effect of a flow rate control valve.

Preferably, the backup oil source is disposed as a bladder energy accumulator, the bladder energy accumulator is connected to an inlet end of the electro-hydraulic proportional directional valve by a hydraulic oil pipe, a plate-type one-way valve is disposed between the bladder energy accumulator and a hydraulic source, and the plate-type one-way valve is configured to add hydraulic oil and keep hydraulic oil flowing in a single direction to the bladder energy accumulator.

By means of the technical solution, the bladder energy accumulator is used as the backup oil source of the system and supplies hydraulic oil to the hydraulic braking system during safety braking (including power outage). To ensure normal start of safety braking, oil is first added for the working of the bladder energy accumulator when the hydraulic braking system is started.

Preferably, the operating mode switching apparatus is disposed as a three-position four-way electromagnetic reversing valve, the three-position four-way electromagnetic reversing valve is configured to switch the hydraulic system between a normal working operating mode and a safety braking operating mode, the three-position four-way electromagnetic reversing valve is bypassed with a direct-acting overflow valve configured to adjust pressure, and the direct-acting overflow valve is configured to limit pre-braking working oil pressure of the system.

By means of the technical solution, the direct-acting overflow valve is configured to limit the pre-braking working oil pressure of the system. The direct-acting overflow valve further provides safety protection in a constant-deceleration braking stage, so that if the adjustment of an electro-hydraulic proportional directional valve fails, the valve core can be prevented from an over-travel, and an accidental "brake releasing" action is therefore avoided. A hydraulic station can supply pressurized oil with different oil pressure values to the execution component. The oil pressure is adjusted by using a proportional overflow valve. The magnitude of a control voltage of the proportional overflow valve is changed to implement an adjustable oil pressure of the braking system. With the intelligent control of a multi-channel direct-acting overflow valve and the electro-hydraulic proportional directional valve, the idle travel time of a brake is reduced, and the time of establishing braking torque is adjusted, thereby restricting power impact during safety braking of the hoist system.

Preferably, programmable logic controller (PLC) redundant control is used for closed-loop speed adjustment of the constant-deceleration electrical closed-loop control system, each oil return channel is independently equipped with a PLC, and each PLC is configured to ensure a dynamic adjustment characteristic of the oil return channel.

By means of the technical solution, the constant-deceleration electrical closed-loop control system displays various faults in real time, so that a maintainer can conveniently learn about an operation status of the hydraulic braking system and can locate a fault on site and make repair conveniently. A PLC is highly reliable and therefore can operate almost faultlessly. Because a relatively few types of electrical components are used in the constant-deceleration electrical closed-loop control system, the reliability is high, and the maintenance costs are beneficially reduced.

Preferably, the detection and feedback apparatus includes a location sensor and a speed measuring sensor that are disposed at the hoist.

By means of the technical solution, the location sensor and the speed measuring sensor of the hoist perform detection in real time to intelligently control an operating status of the execution component near a shaft entrance. When it is detected that an accident occurs at the hoist near the shaft entrance, the constant-deceleration electrical closed-loop control system sends an instruction to implement first-level safety braking for the shaft entrance to prevent overwinding and derailing accidents. In stages of starting and stopping the hoist, the constant-deceleration electrical closed-loop control system monitors the driving torque of electric motors and braking torque to strictly prevent a derailing accident.

Preferably, a cut-off valve configured to cut off hydraulic oil is disposed between the execution component and a hydraulic station.

By means of the technical solution, the cut-off valve is configured to isolate hydraulic oil, thereby facilitating examination and repair and further optimizing the structure.

Preferably, the system further includes a variable plunger pump, where the variable plunger pump is configured to avoid excessive heating and ensure stable oil pressure of the braking circuits.

By means of the technical solution, the variable plunger pump is used as an oil pump, and the bladder energy accumulator and the electro-hydraulic proportional directional valve are added. Therefore, a flow rate of the hydraulic braking system can be adjusted to provide the execution component with preset braking torque to adapt to different speed requirements of different execution components. The problems such as high inertia impact and intense shaking caused by excessively large emergency braking deceleration in a conventional hydraulic braking system are thoroughly overcome.

Preferably, the system further includes a protection system, where the protection system includes a pressure protection apparatus, a temperature protection apparatus, and a liquid level protection apparatus, where the pressure protection apparatus is configured to raise an alarm and brake the hoist when a brake releasing pressure is exceeded; the temperature protection apparatus is configured to raise an alarm and temporarily restrict second hoisting and electrification of a main motor when an allowable temperature of the system is exceeded; and the liquid level protection apparatus is configured to give an alarm prompt when a liquid level is less than a permitted value.

By means of the technical solution, various parameters of the system are intelligently monitored, thereby greatly reducing the occurrence of accidents.

In conclusion, the present invention has achieved the following advantageous effects:

1. A plurality of working channels and one backup channel are used. When one of the working channels is damaged, the backup channel is filled in to ensure both a sufficient safety factor and a sufficient braking force.

2. With the intelligent control of a multi-channel overflow valve and an electro-hydraulic proportional directional valve, the idle travel time of the execution component is reduced, and the time of establishing braking torque is adjusted, thereby restricting power impact during safety braking of the hoist system. The variable plunger pump is used as an oil pump, and the bladder energy accumulator and the electro-hydraulic proportional directional valve are added. Therefore, a flow rate of the hydraulic braking system can be adjusted to provide a disc brake with preset braking torque to adapt to different speed requirements of different execution components. The problems such as high inertia impact and intense shaking caused by excessively large emergency braking deceleration in a conventional hydraulic braking system are thoroughly overcome. The advantageous effects of impact and vibration limiting, slip prevention, rope loosening prevention, and rope breakage prevention are achieved.

3. The location sensor and the speed measuring sensor of the hoist perform detection in real time to intelligently control an operating status of a brake near a shaft entrance. When it is detected that an accident occurs at the hoist near the shaft entrance, the constant-deceleration electrical closed-loop control system sends an instruction to implement first-level safety braking for the shaft entrance to prevent overwinding and derailing accidents. In stages of starting and stopping the hoist, the constant-deceleration electrical closed-loop control system monitors the driving torque of electric motors and braking torque to strictly prevent a derailing accident and achieve intelligent braking, overwinding prevention, and derailing prevention at a shaft entrance.

4. PLC redundant control is used for speed closed-loop control use in the constant-deceleration electrical closed-loop control system. The adjustment is simple, highly accurate, and constant. Each channel is equipped with an independent PLC to ensure its dynamic adjustment characteristic. The system is more reliable and requires low maintenance costs.

In the figures: 1, oil tank; 2, variable plunger pump; 3, proportional overflow valve; 4, direct-acting overflow valve; 5, three-position four-way electromagnetic reversing valve; 6, two-position three-way electromagnetic reversing valve; 7, electro-hydraulic proportional directional valve; 8, bladder energy accumulator; 9, disc brake; 10, plate-type one-way valve; 11, cut-off valve; 12, programmable logic controller (PLC); 13, location sensor; 14, speed measuring sensor; 15, hydraulic station; 16, protection system; and 17, main motor.

DESCRIPTION OF THE EMBODIMENTS

The present invention is further described below in detail with reference to the accompanying drawings.

Figure 1:
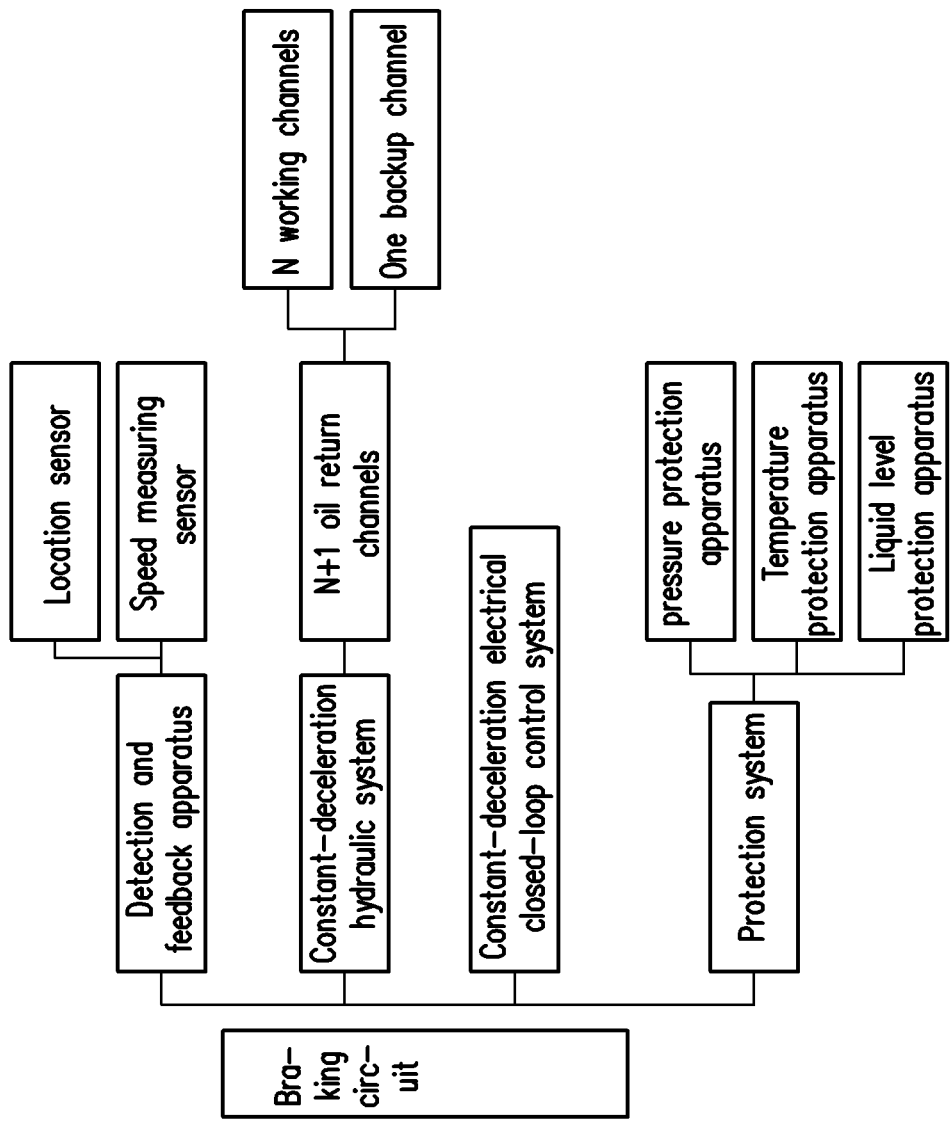
FIG. 1 is an overall schematic diagram of a hydraulic braking system.
Figure 2:
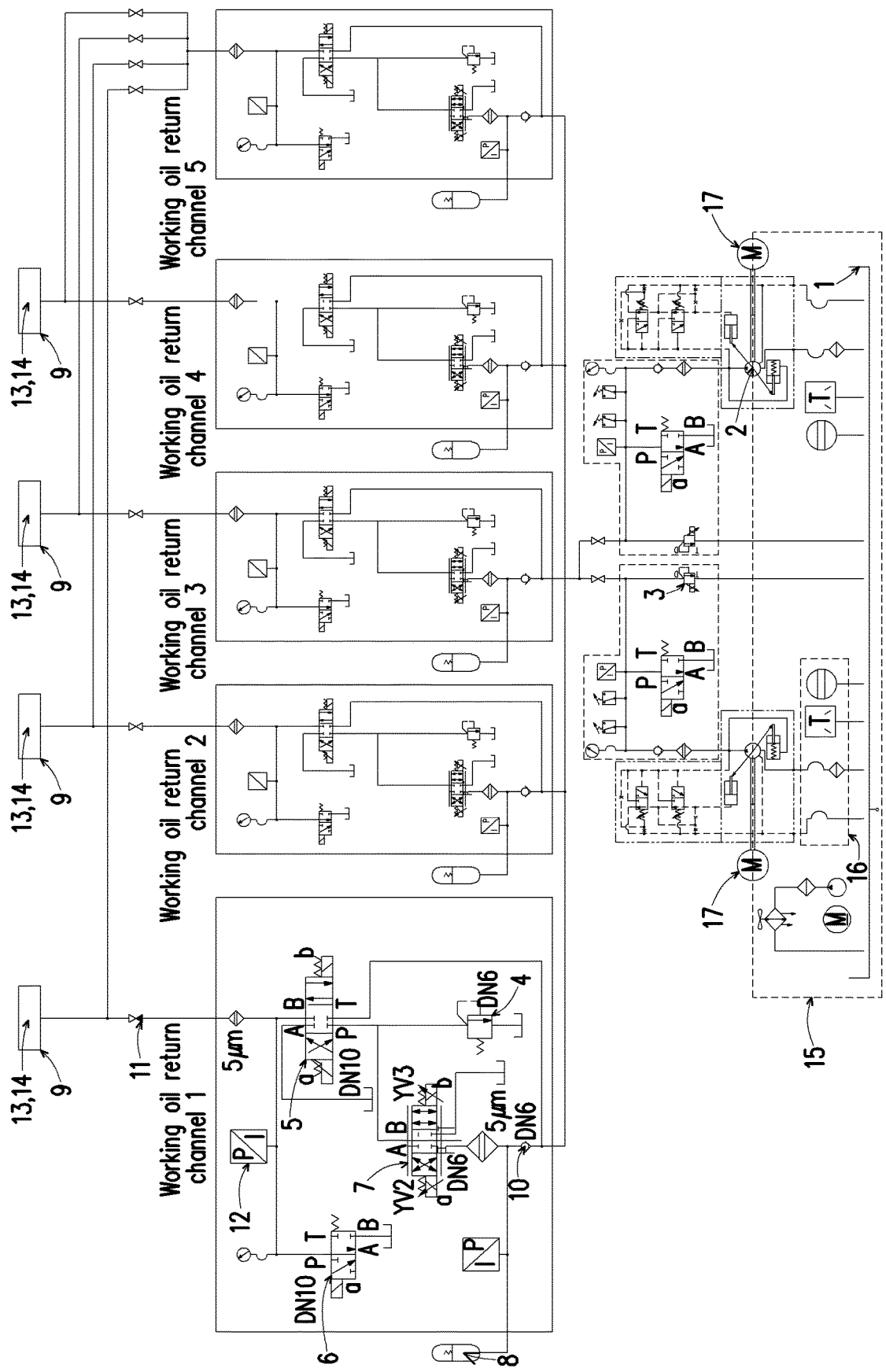
FIG. 2 is a schematic diagram showing the hydraulic principle in this embodiment.

Embodiment: As shown in FIG. 1 and FIG. 2, a multi-channel impact-resistant intelligent-constant-deceleration hydraulic braking system includes a braking circuit formed by a constant-deceleration hydraulic system, a constant-deceleration electrical closed-loop control system, and a detection and feedback apparatus. The constant-deceleration hydraulic system is provided with N+1 independent complete oil return channels. Each independent braking circuit of the N+1 oil return channels is one complete circuit having a constant-deceleration braking function and can independently complete a constant-deceleration braking process of a mine hoist.

N is a positive integer greater than or equal to 3. The oil return channels are disposed in parallel to form parallel independent braking circuits, that is, are "multi-channel" and do not have a "common output point". The oil return channels include one backup channel and N working channels. A solution with a single station, dual pumps, a plurality of working channels, and one backup oil return channel is adopted. To ensure an adequate safety factor, at least three or more independent working oil return channels should be disposed and connected in parallel to form a control system, and one backup oil return channel is disposed.

In this embodiment, for example, N is 4. 4+1=5 oil return channels are used, where four of the five oil return channels are the working channels, and one is the backup channel. The four independent working oil return channels are all in a working state, and one backup oil return channel is in an off state.

As shown in FIG. 1 and FIG. 2, the oil return channel includes a backup oil source, an electro-hydraulic signal conversion and amplification component, an operating mode switching apparatus, and an execution component that are sequentially connected. The electro-hydraulic signal conversion and amplification component is configured to output hydraulic oil with accordingly changing flow rates and directions in response to an input continuously-changing electrical signal instruction. The electro-hydraulic signal conversion and amplification component is disposed as an electro-hydraulic proportional directional valve 7 in this embodiment. The electro-hydraulic proportional directional valve 7 changes a moving direction of a valve core according to the sign of an input electrical signal, and proportionally controls an opening degree of the valve core according to the magnitude of the input electrical signal. The electro-hydraulic proportional directional valve 7 can change a moving direction of the valve core according to the sign of the input electrical signal to change a flowing direction of hydraulic oil, thereby producing the effect of a reversing valve; and can proportionally control the opening degree of the valve core according to the magnitude of the input electrical signal to achieve the objective of controlling a flow rate of hydraulic oil, thereby producing the effect of a flow rate control valve.

The backup oil source is configured to supply hydraulic oil to the constant-deceleration hydraulic system in a case such as safety braking and a power outage. The backup oil source is disposed as a bladder energy accumulator 8 in this embodiment. The bladder energy accumulator 8 is connected to an inlet end of the electro-hydraulic proportional directional valve 7 by a hydraulic oil pipe. A plate-type one-way valve 10 is disposed between the bladder energy accumulator 8 and a hydraulic source. The plate-type one-way valve 10 is configured to add hydraulic oil and keep hydraulic oil flowing in a single direction to the bladder energy accumulator 8. The bladder energy accumulator 8 is used as the backup oil source of the system and supplies hydraulic oil to the hydraulic braking system during safety braking (including power outage). To ensure normal start of safety braking, oil is first added for the working of the bladder energy accumulator 8 when the hydraulic braking system is started.

The execution component is disposed as a disc brake 9 in this embodiment, is used as a hydraulic pressure-force conversion apparatus for the entire system to convey hydraulic oil, and is also the execution component for braking. The disc brake 9 has different specifications and correspondingly generates braking forces with different magnitudes. To generate a suitable braking force, appropriate specifications and an appropriate quantity of pairs of the disc brakes 9 need to be configured. If the disc brake 9 that generates a large braking force is used, when one pair of disc brakes 9 fail, an excessively large braking force is generated to cause excessively large braking deceleration. This eventually causes a steel wire rope to exceed an anti-slip limit to slip, and as a result, a rope is more prone to breakage.

The operating mode switching apparatus is disposed as a three-position four-way electromagnetic reversing valve 5 in this embodiment. The three-position four-way electromagnetic reversing valve 5 is configured to switch the hydraulic system between a normal working operating mode and a safety braking operating mode. The three-position four-way electromagnetic reversing valve 5 is bypassed with a direct-acting overflow valve 4 configured to adjust pressure. The direct-acting overflow valve 4 is configured to limit a pre-braking working oil pressure of the system. The direct-acting overflow valve 4 further provides safety protection in a constant-deceleration braking stage, so that if the adjustment of an electro-hydraulic proportional directional valve fails, the valve core can be prevented from an over-travel, and an accidental "brake releasing" action is therefore avoided. A hydraulic station 15 can supply pressurized oil with different oil pressure values to the execution component. An oil pressure is adjusted by using a proportional overflow valve 3. The magnitude of a control voltage of the proportional overflow valve 3 is changed to implement an adjustable oil pressure of the braking system. With the intelligent control of the direct-acting overflow valve 4 and the electro-hydraulic proportional directional valve 7, the idle travel time of a brake is reduced, and the time of establishing braking torque is adjusted, thereby restricting power impact during safety braking of a hoist system.

A two-position three-way electromagnetic reversing valve 6 is configured to form independent parallel redundant oil return channels, and is electrified in a normal stop operating mode to be in the left position (conducting), so that hydraulic oil flows back to the oil tank 1 to implement reliable stop and braking. The two-position three-way electromagnetic reversing valve 6 is generally in a power-off (off) state in other operating modes.

The constant-deceleration electrical closed-loop control system is configured to: receive a speed feedback signal, compare the speed feedback signal with a built-in set speed signal, and send a control instruction to the electro-hydraulic signal conversion and amplification component according to a comparison result to form a closed-loop speed control circuit via the execution component. PLC redundant control is used for closed-loop speed adjustment of the constant-deceleration electrical closed-loop control system. Each oil return channel is independently equipped with a PLC 12.

Each PLC 12 is configured to ensure a dynamic adjustment characteristic of the oil return channel. The constant-deceleration electrical closed-loop control system displays various faults in real time, so that a maintainer can conveniently learn about an operation status of the hydraulic braking system and can locate a fault on site and make repair conveniently. A PLC 12 is highly reliable and therefore can operate almost faultlessly. Because a relatively few types of electrical components are used in the constant-deceleration electrical closed-loop control system, the reliability is high, and the maintenance costs are beneficially reduced.

As shown in FIG. 2, the internal structure of only one of the oil return channels is described in detail. The rest have the same internal structure and are not described to avoid repetition. The independent working oil return channels can separately complete a constant-deceleration braking process of the control system, and can control a braking process of the execution component together under the control of an instruction signal of a same constant-deceleration set value and a speed feedback signal detected by a same speed sensor. When one of the independent working oil return channels encounters a fault of no output, the oil return channel is in an off state, the hydraulic braking system rapidly switches to the backup oil return channel, and four independent oil return channels still can normally complete a constant-deceleration safety braking process. When two of the independent working oil return channels encounter a fault of no output, the hydraulic braking system rapidly switches to the backup oil return channel, and three independent oil return channels still can normally complete a constant-deceleration safety braking process. When one of the independent working oil return channels encounters a fault of complete oil leakage and is in an on state, the hydraulic braking system rapidly switches to the backup oil return channel. By means of a compensation effect of an effective output of the backup oil return channel, the entire control system still can normally complete a constant-deceleration safety braking process.

As shown in FIG. 2, a cut-off valve 11 configured to cut off hydraulic oil is disposed between the execution component and a hydraulic station 15. The cut-off valve 11 is configured to isolate hydraulic oil, thereby facilitating examination and repair and further optimizing the structure. The system further includes a variable plunger pump 2. The variable plunger pump 2 is configured to avoid excessive heating and ensure stable oil pressure of the braking circuits. The variable plunger pump 2 is used as an oil pump, and the bladder energy accumulator 8 and the electro-hydraulic proportional directional valve 7 are added. Therefore, a flow rate of the hydraulic braking system can be adjusted to provide the execution component with preset braking torque to adapt to different speed requirements of different execution components. The problems such as high inertia impact and intense shaking caused by excessively large emergency braking deceleration in a conventional hydraulic braking system are thoroughly overcome.

As shown in FIG. 2, the detection and feedback apparatus is configured to: collect a speed feedback signal of a winding drum of a hoist, and feed back the speed feedback signal to a constant-deceleration electrical closed-loop control system of each oil return channel. The detection and feedback apparatus includes a location sensor 13 and a speed measuring sensor 14 that are disposed at the hoist. The location sensor 13 and the speed measuring sensor 14 of the hoist perform detection in real time to intelligently control an operating status of the execution component near a shaft entrance. When it is detected that an accident occurs at the hoist near the shaft entrance, the constant-deceleration electrical closed-loop control system sends an instruction to implement first-level safety braking for the shaft entrance to prevent overwinding and derailing accidents. In stages of starting and stopping the hoist, the constant-deceleration electrical closed-loop control system monitors the driving torque of electric motors and braking torque to strictly prevent a derailing accident.

As shown in FIG. 2, the system further includes a protection system 16. The protection system 16 includes a pressure protection apparatus, a temperature protection apparatus, and a liquid level protection apparatus. The pressure protection apparatus is configured to raise an alarm and brake the hoist when a brake releasing pressure of 2 MPa to 3 MPa is exceeded. The temperature protection apparatus is configured to raise an alarm and temporarily restrict second hoisting and electrification of a main motor 17 when an allowable temperature of the system is exceeded. The liquid level protection apparatus is configured to give an alarm prompt when a liquid level is less than a permitted value.

A working procedure is as follows: The four working channels and one backup channel in this embodiment are used as an example. In a normal stop operating mode, that is, when the hoist stops working, the braking system needs to reliably brake the hoist.

In this case, the motor and the variable plunger pump 2 are turned off, and the two-position three-way electromagnetic reversing valves 6 of the four working channels are electrified to be in the left position (conducting), and the three-position four-way electromagnetic reversing valves 5 are electrified to be in the right position, both being in an oil return state to two independent parallel redundant oil return channels. In addition, the three-position four-way electromagnetic reversing valve 5 of the backup channel is powered off to be in the middle position, so that the current in the pilot proportional overflow valve 3 is reduced to zero, and the pressure of the system is reduced to the minimum (to a residual pressure). In this case, hydraulic oil flows to the pilot proportional overflow valve 3 through the disc brake 9, a filter, and the three-position four-way electromagnetic reversing valves 5 of the working channels, and eventually flows back to the oil tank 1. In the entire process, the spring force of the disc brake 9 overcomes the hydraulic force, and the disc brake 9 brakes the winding drum of the hoist. The hoist decelerates till it stops working. The hoist is in a completely braked state.

In an operation braking operating mode, that is, when the hoist normally works, it is mainly reflected that the hoist is working in a deceleration stage, and the braking system supplies adjustable pressurized oil to the disc brake 9, so that the hoist can obtain different braking torque to enable normal operation, speed adjustment, and stop of the mine hoist.

In this case, the motor and the variable plunger pump 2 are started. Hydraulic oil flows past the variable plunger pump 2 and the filter. The three-position four-way electromagnetic reversing valves 5 of the four working channels are electrified to be in the right position, and the three-position four-way electromagnetic reversing valve 5 of the backup channel is powered off to be in the middle position. In this case, hydraulic oil flows to the disc brake 9 through the three-position four-way electromagnetic reversing valves 5 of the working channels. Hydraulic oil in another oil path flows to the bladder energy accumulators 8 of the four working channels and the backup channel through the plate-type one-way valve 10. The current in the pilot proportional overflow valve 3 is increased. When the pressure of the system rises to be greater than a set value, the hydraulic force in the disc brake 9 overcomes the spring force, the disc brake 9 is released, and the hoist starts working.

In a constant-deceleration safety braking operating mode, that is, when an emergency occurs in the hoist, for example, a fault such as excessively high hoisting speed, overwinding, or over-current or under-voltage in the control system occurs, the braking system can enter a constant-deceleration safety braking mode to automatically adjust braking oil pressure in the disc brake 9, so that the hoist completes constant-deceleration braking according to preset deceleration until the hoist is braked and stopped. After stop, all oil pressure values in the disc brake 9 rapidly return to zero, so that the hoist system is in a completely braked state.

In this case, the constant-deceleration electrical closed-loop control system sends a safety braking signal, and the three-position four-way electromagnetic reversing valve 5 is electrified to be in the left position, so that an oil pressure circuit of the disc brake 9 is integrated into a constant-deceleration braking circuit. Under the effect of the direct-acting overflow valve 4, most of the hydraulic oil in the brake 9 flows back to the oil tank 1 through the direct-acting overflow valve 4, and oil pressure inside the brake 9 is reduced to a particular value. The value is set during system initialization of the direct-acting overflow valve 4, so that when constant-deceleration safety braking begins, the brake 9 is in a braked state.

The constant-deceleration electrical closed-loop control system receives a speed feedback signal provided by the speed measuring sensor 14, compares an offset according to an expected deceleration value of constant-deceleration braking set in the system and the speed feedback signal, and then applies a particular control current signal to an electro-hydraulic proportional directional valve 7.

After receiving the control current signal sent by the constant-deceleration electrical closed-loop control system, the electro-hydraulic proportional directional valve 7 uses its own amplifier to provide a corresponding current to enable an electromagnet to generate a force on the valve core to push the valve core to move left or right to open a valve opening. The opening size of the valve opening of the electro-hydraulic proportional directional valve 7/the distance by which the valve core moves left or right, that is, the degree of increasing or reducing a braking torque operation, is proportional to the magnitude of the input electrical signal instruction.

The hydraulic oil in the bladder energy accumulator 8 flows to the brake 9 through the electro-hydraulic proportional directional valve 7 and the three-position four-way electromagnetic reversing valve 5.

When the electro-hydraulic proportional directional valve works at the right position, it indicates that the hoist has excessively large deceleration, and the bladder energy accumulator 8 supplies hydraulic oil to the disc brake 9 to reduce braking torque to reduce a deceleration value in the system in this case. When the electro-hydraulic proportional directional valve 7 works at the left position, it indicates that the deceleration of the hoist is less than a predetermined deceleration value, and the disc brake 9 discharges oil into the oil tank 1, so that the disc brake 9 is tightly attached to a brake disc to increase braking torque to increase the deceleration value of the hoist. When the electro-hydraulic proportional directional valve 7 works at the middle position, it indicates that the deceleration and offset of the hoist meets requirements, and the oil pressure and deceleration of the brake 9 are kept constant until the hoist completely stops.

When the constant-deceleration electrical closed-loop control system detects that one of the independent working oil return channels encounters a fault of no output, the oil return channel is in an off state, the hydraulic braking system rapidly switches to the backup oil return channel, and four independent oil return channels still can normally complete a constant-deceleration safety braking process. When two of the independent working oil return channels encounter a fault of no output, the hydraulic braking system rapidly switches to the backup oil return channel, and three independent oil return channels still can normally complete a constant-deceleration safety braking process.

When one of the independent working oil return channels encounters a fault of complete oil leakage and is in an on state, the hydraulic braking system rapidly switches to the backup oil return channel. By means of a compensation effect of an effective output of the backup oil return channel, the entire control system still can normally complete a constant-deceleration safety braking process.

In addition to the foregoing functions, the multi-channel impact-resistant intelligent-constant-deceleration hydraulic braking system of the present invention further has the following functions:

Pressure protection: The system is provided with over-pressure protection. When the pressure exceeds the brake releasing pressure of 2 MPa to 3 MPa, the system sends an alarm signal and stops the hoist.

Temperature protection: During the working of the system, when the temperature exceeds the allowable temperature of the system, the system sends an alarm signal. However, during second hoisting, the main motor 17 cannot be electrified. The system needs to wait for the oil temperature to drop before the system can normally work.

Liquid level protection: A liquid level controller may send an alarm signal when a liquid level is low.

This specific embodiment is merely used to describe the present invention rather than to limit the present invention. After reading this specification, a person skilled in the art may make modifications to this embodiment as required without any creative effort. However, content that falls within the scope of the claims of the present invention is protected by patent laws.

What is claimed is:

1. A multi-channel impact-resistant intelligent-constant-deceleration hydraulic braking system, comprising a braking circuit formed by a constant-deceleration hydraulic system, a constant-deceleration electrical closed-loop control system, and a detection and feedback apparatus, wherein
the constant-deceleration hydraulic system is provided with N+1 oil return channels, wherein N is a positive integer greater than or equal to 3, the oil return channels are disposed in parallel to form the braking circuits, and the oil return channel comprises a backup oil source, an electro-hydraulic signal conversion and amplification component, an operating mode switching apparatus, and an execution component that are sequentially connected;
the oil return channels comprise one backup channel and N working channels;
the backup oil source is configured to supply hydraulic oil to the constant-deceleration hydraulic system in a situation of safety braking and a power outage;
the electro-hydraulic signal conversion and amplification component is configured to output hydraulic oil with accordingly changing flow rates and directions in response to an input continuously-changing electrical signal instruction;

the constant-deceleration electrical closed-loop control system is configured to: receive a speed feedback signal, compare the speed feedback signal with a built-in set speed signal, and send a control instruction to the electro-hydraulic signal conversion and amplification component according to a comparison result to form a closed-loop speed control mechanism via the execution component; and the detection and feedback apparatus is configured to: collect the speed feedback signal and feed back the speed feedback signal to the constant-deceleration electrical closed-loop control system of each oil return channel.

2. The multi-channel impact-resistant intelligent-constant-deceleration hydraulic braking system according to claim 1, wherein, for each of the oil return channels, the electro-hydraulic signal conversion and amplification component is disposed as an electro-hydraulic proportional directional valve (7), and the electro-hydraulic proportional directional valve (7) changes a moving direction of a valve core according to a sign of an input electrical signal, and proportionally controls an opening degree of the valve core according to a magnitude of the input electrical signal.

3. The multi-channel impact-resistant intelligent-constant-deceleration hydraulic braking system according to claim 2, wherein, for each of the oil return channels, the backup oil source is disposed as a bladder energy accumulator (8), the bladder energy accumulator (8) is connected to an inlet end of the electro-hydraulic proportional directional valve (7) by a hydraulic oil pipe, a plate-type one-way valve (10) is disposed between the bladder energy accumulator (8) and a hydraulic source, and the plate-type one-way valve (10) is configured to add hydraulic oil and keep the hydraulic oil flowing in a single direction to the bladder energy accumulator (8).

4. The multi-channel impact-resistant intelligent-constant-deceleration hydraulic braking system according to claim 1, wherein, for each of the oil return channels, the operating mode switching apparatus is disposed as a three-position four-way electromagnetic reversing valve (5), the three-position four-way electromagnetic reversing valve (5) is configured to switch the hydraulic system between a normal working operating mode and a safety braking operating mode, the three-position four-way electromagnetic reversing valve (5) is bypassed with a direct-acting overflow valve (4) configured to adjust pressure, and the direct-acting overflow valve (4) is configured to limit pre-braking working oil pressure of the multi-channel impact-resistant intelligent-constant-deceleration hydraulic braking system.

5. The multi-channel impact-resistant intelligent-constant-deceleration hydraulic braking system according to claim 1, wherein, for each of the oil return channels, programmable logic controller (PLC) redundant control is used for closed-loop speed adjustment of the constant-deceleration electrical closed-loop control system, each oil return channel is independently equipped with a PLC (12), and each PLC (12) is configured to ensure a dynamic adjustment characteristic of the oil return channel.

6. The multi-channel impact-resistant intelligent-constant-deceleration hydraulic braking system according to claim 1, wherein, for each of the oil return channels, the detection and feedback apparatus comprises a location sensor (13) and a speed measuring sensor (14).

7. The multi-channel impact-resistant intelligent-constant-deceleration hydraulic braking system according to claim 1, wherein, for each of the oil return channels, a cut-off valve (11) configured to cut off hydraulic oil is disposed between the execution component and a hydraulic station (15).

8. The multi-channel impact-resistant intelligent-constant-deceleration hydraulic braking system according to claim 1, further comprising a variable plunger pump (2), wherein, for each of the oil return channels, the variable plunger pump (2) is configured to ensure stable oil pressure of the braking circuits.

9. The multi-channel impact-resistant intelligent-constant-deceleration hydraulic braking system according to claim 1, further comprising a protection system (16), wherein, for each of the oil return channels, the protection system (16) comprises a pressure protection apparatus, a temperature protection apparatus, and a liquid level protection apparatus, wherein the pressure protection apparatus is configured to raise an alarm when a brake releasing pressure is exceeded; and the temperature protection apparatus is configured to raise an alarm and temporarily restrict second hoisting and electrification of a main motor (17) when a specific temperature of the multi-channel impact-resistant intelligent-constant-deceleration hydraulic braking system is exceeded; and the liquid level protection apparatus is configured to give an alarm prompt when a liquid level is less than a specific value.

\* \* \* \* \*